US008934390B2

(12) United States Patent
Chu et al.

(10) Patent No.: US 8,934,390 B2
(45) Date of Patent: Jan. 13, 2015

(54) ENHANCEMENT OF LOW POWER MEDIUM ACCESS STAS

(71) Applicant: STMicroelectronics, Inc., Coppell, TX (US)

(72) Inventors: Liwen Chu, San Ramon, CA (US); George A. Vlantis, Sunnyvale, CA (US)

(73) Assignee: STMicroelectronics, Inc., Coppell, TX (US)

( * ) Notice: Subject to any disclaimer, the term of this patent is extended or adjusted under 35 U.S.C. 154(b) by 119 days.

(21) Appl. No.: 13/631,284

(22) Filed: Sep. 28, 2012

(65) Prior Publication Data

US 2014/0092797 A1    Apr. 3, 2014

(51) Int. Cl.

| | |
|---|---|
| *G08C 17/00* | (2006.01) |
| *G01R 31/08* | (2006.01) |
| *G06F 11/00* | (2006.01) |
| *G08C 15/00* | (2006.01) |
| *H04J 1/16* | (2006.01) |
| *H04J 3/14* | (2006.01) |
| *H04L 1/00* | (2006.01) |
| *H04L 12/26* | (2006.01) |
| *H04L 12/28* | (2006.01) |
| *H04J 3/00* | (2006.01) |
| *H04L 12/413* | (2006.01) |

(52) U.S. Cl.
USPC ............ 370/311; 370/252; 370/254; 370/336; 370/445; 370/350

(58) Field of Classification Search
CPC ..... H04W 28/18; H04W 40/10; H04W 52/02; H04W 52/0216; H04W 52/0219; H04W 52/0229; H04W 52/287; H04W 76/048; H04W 84/12; H04W 88/08; H04L 12/189; H04B 7/2656; H04J 3/0638

USPC .................. 370/311, 336, 252, 254, 350, 445
See application file for complete search history.

(56) References Cited

U.S. PATENT DOCUMENTS

| | | | | |
|---|---|---|---|---|
| 8,509,134 | B2* | 8/2013 | Son et al. | 370/311 |
| 8,611,970 | B2* | 12/2013 | Meylan et al. | 455/574 |
| 2004/0190467 | A1* | 9/2004 | Liu et al. | 370/311 |
| 2005/0047386 | A1* | 3/2005 | Yi | 370/345 |
| 2005/0254444 | A1* | 11/2005 | Meier et al. | 370/312 |
| 2006/0126533 | A1* | 6/2006 | Wang | 370/254 |
| 2006/0187864 | A1* | 8/2006 | Wang et al. | 370/311 |
| 2007/0201413 | A1* | 8/2007 | Laine et al. | 370/338 |
| 2007/0259700 | A1* | 11/2007 | Meier et al. | 455/574 |
| 2007/0297438 | A1* | 12/2007 | Meylan et al. | 370/445 |
| 2008/0002692 | A1* | 1/2008 | Meylan et al. | 370/390 |
| 2009/0252135 | A1* | 10/2009 | Benveniste | 370/338 |
| 2009/0296618 | A1* | 12/2009 | Wang et al. | 370/311 |
| 2010/0226300 | A1* | 9/2010 | Leow et al. | 370/311 |
| 2010/0265864 | A1* | 10/2010 | He et al. | 370/311 |
| 2013/0279381 | A1* | 10/2013 | Sampath et al. | 370/311 |

* cited by examiner

*Primary Examiner* — Benjamin H Elliott, IV
*Assistant Examiner* — Eric Nowlin
(74) *Attorney, Agent, or Firm* — Seed IP Law Group PLLC (57) ABSTRACT

Enhanced low power medium access (LPMA) processes involve the enhanced LPMA STA indicating low power capabilities during association and being allocated an AID. The AID(s) for one or a group of enhanced LPMA STA(s) are included in one TIM sent during a different BEACON interval than the AID(s) for another or another group of enhanced LPMA STA(s). In addition, or alternatively, the AID(s) for enhanced LPMA STA(s) are located at an edge of the AID set within a TIM, a portion of the TIM that may be easily truncated and therefore not sent. The enhanced LPMA STAs and associated access point negotiate unique offset and sleep-interval periods for polling or data uplink by the enhanced LPMA STAs.

27 Claims, 7 Drawing Sheets

ENHANCEMENT OF LOW POWER MEDIUM ACCESS STAS

TECHNICAL FIELD

The present application relates generally to wireless communications and, more specifically, to a system and method for saving power in a wireless station.

BACKGROUND

Devices using Institute for Electrical and Electronic Engineers (IEEE) 802.11 and/or Wireless Local Area Network (WLAN) connectivity for Internet access, smart grid applications, etc. are frequently either battery-powered or otherwise benefit from minimizing power consumption, particularly when not being utilized. For example, individuals working with IEEE 802.11ah are developing methods suitable for use for sensor applications, such as a smart grid application in which the stations are battery powered and must be capable of operation for a long time without replacement of the battery. The Distributed Coordination Function (DCF) of IEEE 802.11 provides a power saving mechanism (PSM) allowing stations (STAs) to remain silent in a "sleep" mode. However, actual use of the PSM can still cause unnecessary power consumption and collisions.

There is, therefore, a need in the art for improved power saving mechanisms in using wireless network connections.

SUMMARY

PS-Poll based power-save methods are improved by not requiring a power-save STA to receive beacons and decode the Traffic Indication Map (TIM), and allowing the power-save STA to send a PS-Poll frame immediately after waking up from a doze state. Several issues with such an improvement are addressed: Although some power-save STAs do not receive and decode the TIM, the Access Point (AP) still needs to carry a buffer frame indication in the TIM for those STAs since the AP does not know which STAs will not decode the TIM. If the AP does not send a TIM buffer frame indication for power-save STAs that do not decode the TIM, the TIM (and therefore the beacon) can become shorter. In addition, when many power-save STAs wake up randomly without decoding the TIM, such STAs may collide with each other. More power is expended when such collisions occur. When, in order to save power, a STA does not wake up to receive all beacons, the STA's timer can not be synchronized with the AP's timer.

Enhanced low power medium access (LPMA) processes involve the enhanced LPMA STA indicating low power capabilities during association. With the help of an enhanced LPMA indication from a STA to the AP, an AP will not carry a buffer frame indication for enhanced LPMA STAs. The AP may optimize the AID allocation, such as by allocating the AIDs of the enhanced LPMA STAs to the AID sets of different groups if the AP separates support for the entire AID set into multiple groups. The AP may also optimize the AID allocation by, for example, allocating the AIDs of enhanced LPMA STAs to the edge of the whole AID set within a TIM. With such AID allocations, the TIM length in the beacons will become shorter. To avoid collisions, the enhanced LPMA STAs and associated access point negotiate unique offset and sleepinterval periods for polling or data uplink by the enhanced LPMA STAs. During the negotiated wake time, the enhanced LPMA STAs can have high priority to access the wireless medium. An AP sends Timing Synchronization Function (TSF) timing information after receiving a trigger frame (e.g., PS-Poll) from an enhanced LPMA STA, for synchronization of an enhanced LPMA STA's timer with the AP's timer even though the enhanced LPMA STA does not wake up to receive and decode any beacons.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 and 5 through 9B, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system.

Low Power Medium Access (LPMA) stations may poll an associated Access Point (AP) by a PSM Power-Save Poll (PS-Poll) at any time, and need not receive a BEACON frame or a traffic indication map (TIM) before communicating with the associated AP. This may help LPMA STAs to save power since LPMA STAs then do not wake up to receive and/or decode TIMs and BEACONs which include the TIMs. Since the AP does not know which STAs are the power-save STAs that do not receive TIMs, the TIM buffer frame indication still needs to cover all power-save STAs. If the AP knows the power-save STAs that do not receive TIMs, the AP can decrease TIM length by optimizing the AID allocation and excluding such STAs from the TIM buffer frame indication. Collisions may occur because LMPA stations wake up and transmit frames at almost the same time. For example, when multiple LMPA stations wake up at or near the same time and send an uplink frame to a mutually associated AP, the uplink frames may collide, which collisions will waste the stored energy of the LPMA STAs. Since the LPMA STAs do not receive the beacon frames, those STAs cannot synchronize their internal timers with the AP's TSF timerthrough the TSF time in beacons broadcast by the AP.

Figure 1:
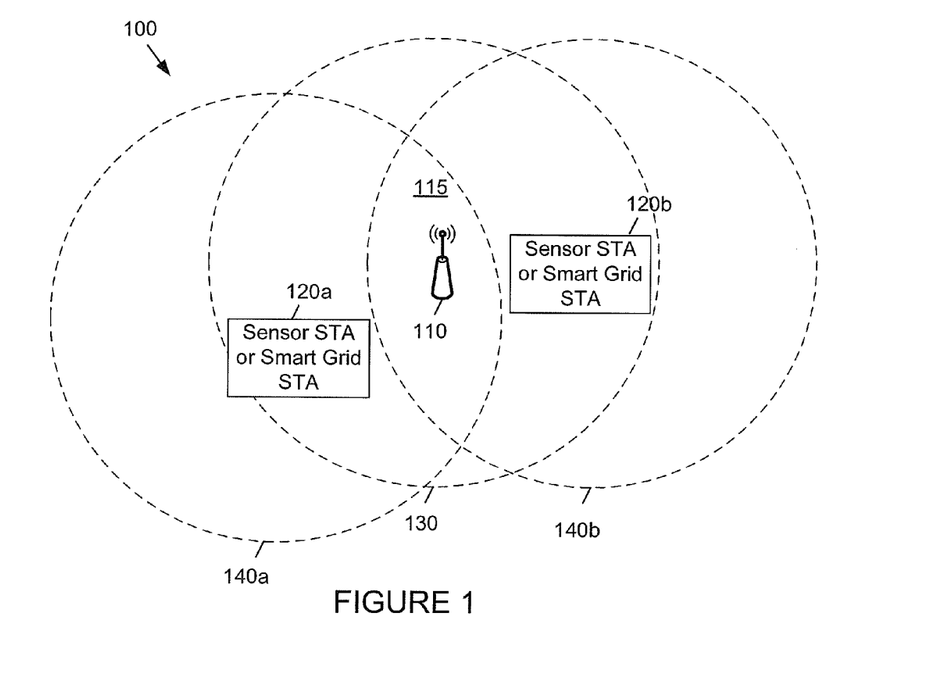
FIG. 1 illustrates a wireless local area network (WLAN) environment in which enhanced low power medium access stations in accordance with various embodiments of the present disclosure are implemented.

FIG. 1 illustrates a wireless local area network (WLAN) environment in which enhanced low power medium access stations in accordance with various embodiments of the present disclosure are implemented. WLAN environment 100 includes a basic service set (BSS) 115 of an IEEE 802.11 wireless local area network. WLAN environment 100 can be implemented, for example, for sensor or smart grid applications. The BSS 115 includes an access point (AP) 110 that is connected to an external network (not shown), such as the smart grid core network, and a plurality of stations (STAs, also called "nodes" or "clients") 120*a* and 120*b* located within coverage area 130 of AP 110. STAs 120*a* and 120*b* are visible to the AP 110 and can communicate with the AP 110. The reception area 140*a* is the coverage area of STA 120*a*, and reception area 140*b* is the coverage area of station 120*b*.

Although certain details will be provided with reference to the components of the access point 110 and the STAs 120*a* and 120*b* (singly, "WiFi device"), it should be understood that other embodiments may include more, less, or different components. A WiFi device includes electrical processing or "control" circuitry configured to control the functions performed by the WiFi device, with aid from the other components within the WiFi device. The processing circuitry includes a programmable processor or controller containing and/or coupled to a memory and other components within the WiFi device. The memory includes any suitable volatile and/or non-volatile storage and retrieval device(s). For example, the memory can include any electronic, magnetic, electromagnetic, optical, electro-optical, electro-mechanical, or other physical device that can contain or store information. The memory can store data and instructions for use by the processor, and in the AP 110 also buffers data received from the Internet for delivery to one of the STAs 120*a* or 120*b*. The WiFi device also includes a transmitter and a receiver which, in certain embodiments, are in the form of a transceiver. The transmitter and receiver are configured to respectively transmit and receive wireless signals, such as radio frequency (RF) signals or the like, through which control information and/or data are communicated with another WiFi device (i.e., from AP 110 to one of STAs 120*a* or 120*b* or vice versa).

802.11 Power Save

At least some STAs 120*a* or 120*b* in the WLAN 100 of FIG. 1 are enhanced low power medium access (LPMA) STAs as described in further detail below. WLAN 100 in the exemplary embodiment includes a "smart grid" BSS 115 and/or a sensing BSS 115, in which almost all STAs are low power STAs and those are preferably enhanced LPMA STAs as described in further detail below. Within WLAN 100, there are times during which the AP 110 and a STA 120*a* or 120*b* are not sending frames to or receiving frames from each other. During these times of non-communication, the STA 120*a* or 120*b* preserves battery life by going to sleep (also called "dozing" or entering a "sleep mode" or "doze mode"). While in sleep mode, the station turns off its transmitter and receiver to conserve energy. The STA 120*a* or 120*b* determines times to sleep and remain in sleep mode by implementing a power saving procedure.

One possible power save procedure is known as Power Save Poll (PS-Poll). In implementing PS-Poll, an AP 110 indicates the buffered frames for the power save STAs with the help of an Association IDentification (AID) allocated to each STA 120*a* or 120*b* that associates with the AP 110. According to IEEE 802.11, an AP 110 can allocate an AID for up to and including two thousand seven (2,007) STAs; according to IEEE 802.11ah, an AP can allocate an AID for up to and including 8,192 STAs. Each access point maintains a traffic indication map (TIM), which is a bit mask containing a number of bits. The TIM indicates whether the AP has any buffered frames for each associated STA. The number of bits in a TIM is determined by the number of stations for which the AP has buffered frames. When all STAs in the BSS are power save STAs and the AP has buffered frames for all such STAs, the number of bits in a TIM equals the number of STAs with which the access point is capable of simultaneous association. Under those circumstances, the total group of STAs with which an AP is capable of simultaneous association is the AP's AID set. For example, an access point 110 capable of associating with 2,007 stations has an AID set of 2,007 AIDs. Each bit in the TIM represents an AID of an associated STA 120*a* or 120*b*.

TIM Information Element

Figure 2:
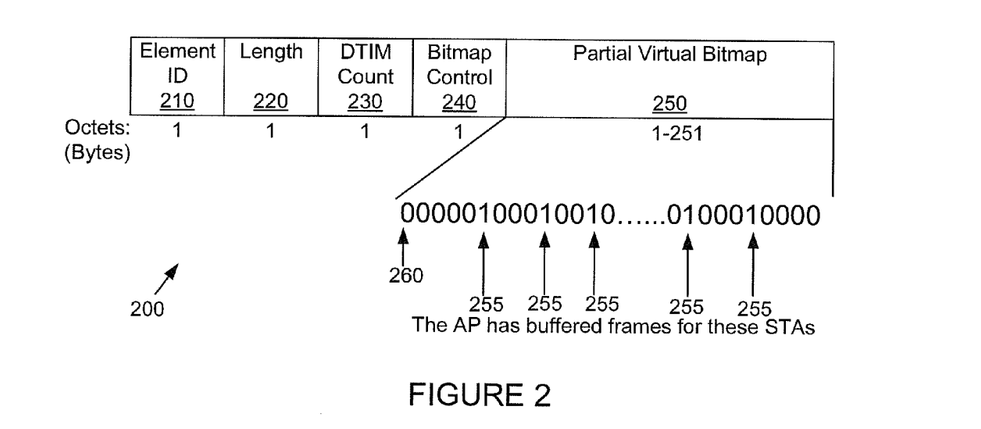
FIG. 2 is a diagram of traffic indication map (TIM) information element (IE) transmitted within wireless local area network environment including enhanced low power medium access stations.

FIG. 2 is a diagram of traffic indication map (TIM) information element (IE) transmitted within wireless local area network environments including enhanced low power medium access ssclosure. The AP 110 sends a TIM information element (TIM IE) 200 to the associated STAs 120*a*, 120*b* as an indicator of which associated STA(s) 120*a* or 120*b* have buffered frames at the AP. The AP 110 broadcasts a beacon frame (BEACON) that includes the TIM IE 200. The TIM IE 200 includes up to two hundred fifty-six (256) bytes (i.e., octets of bits) that make up the five fields of the TIM IE 200 when the maximum of the associated STAs is 2,007. The first byte corresponds to Element ID field 210; the second byte corresponds to Length field 220; the third byte corresponds to Delivery TIM (DTIM) Count field 230; the fourth byte corresponds to Bitmap Control field 240; and the remaining bytes correspond to Partial Virtual Bitmap field 250. Each field 210-240 of the TIM IE 200 is one-byte long (i.e., one octet of bits; eight (8) bits long), except the Partial Virtual Bitmap (PVB) field 250, which may vary in size from one byte to two hundred fifty-one (251) bytes long. Bitmap Control field 240 can be mapped to the smallest AID that have buffered frames in AP, and the AP doesn't have buffered frames for the STAs whose AID values are smaller than the AID mapped by the Bitmap Control field 240.

The AP 110 shortens the size of the BEACON by shortening the size of the TIM IE 200 included therein. One way the AP 110 shortens the TIM IE 200 is by transmitting a portion of the Virtual Bitmap of STAs in the TIM of the BEACON that covers the STAs for which the AP has buffered frames, without transmitting the Virtual Bitmap of the entire STAs that are associated with the AP. For example, the Partial Virtual Bitmap field 250 may be one portion of the STAs that the AP selects to transmit within the TIM IE 200.

The Partial Virtual Bitmap field 250 is the portion of the TIM IE 200 that indicates which STAs 120a or 120b associated with the AP have buffered frames. Each bit in the Partial Virtual Bitmap field 250 indicates whether the AP has buffered frames for the station identified by adding the AID value mapped by the Bitmap Control field 240 and the position value of the bit in Partial Virtual Bitmap field 250. When the bit 255 corresponding to an associated STA has a bit value of a logical one (1), the logical one (1) indicates that the AP 110 has buffered frames for the STA 120a or 120b. When the bit 260 corresponding to an associated STA 120a or 120b has a bit value of a logical zero (0), the logical zero (0) indicates that the station does not have buffered frames at the AP. The AP has no buffered frames for the STAs whose AID values are larger than the addition of the AID value mapped by the Bitmap Control field 240 and the value of the last position of the bit in Partial Virtual Bitmap field 250.

Low Power Medium Access STAs

Figure 3:
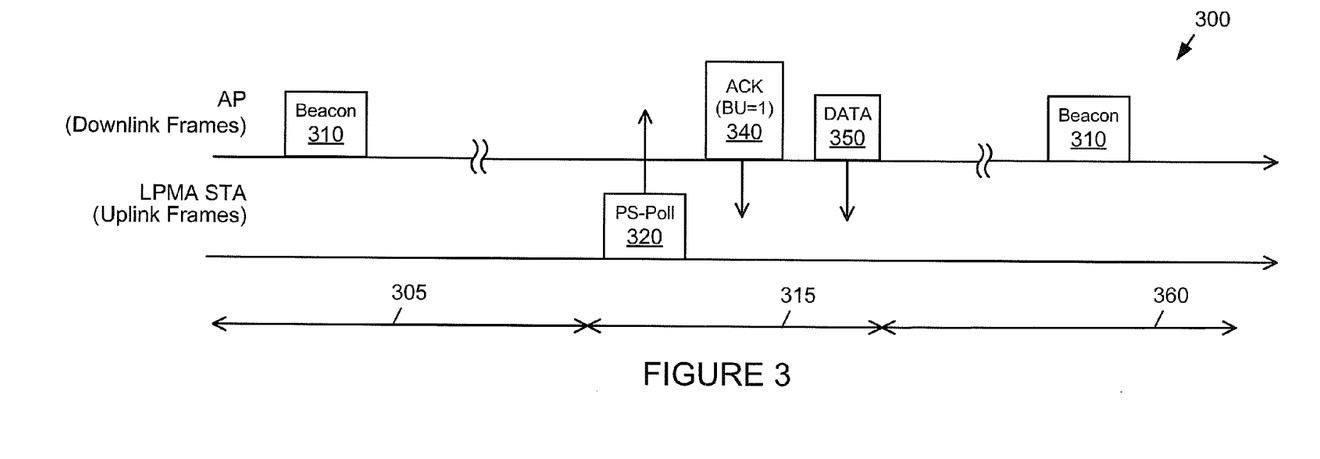
FIGS. 3 and 4 each illustrate alternative beacon interval timelines for a portion of communications within wireless local area network environment including enhanced low power medium access stations.
Figure 4:
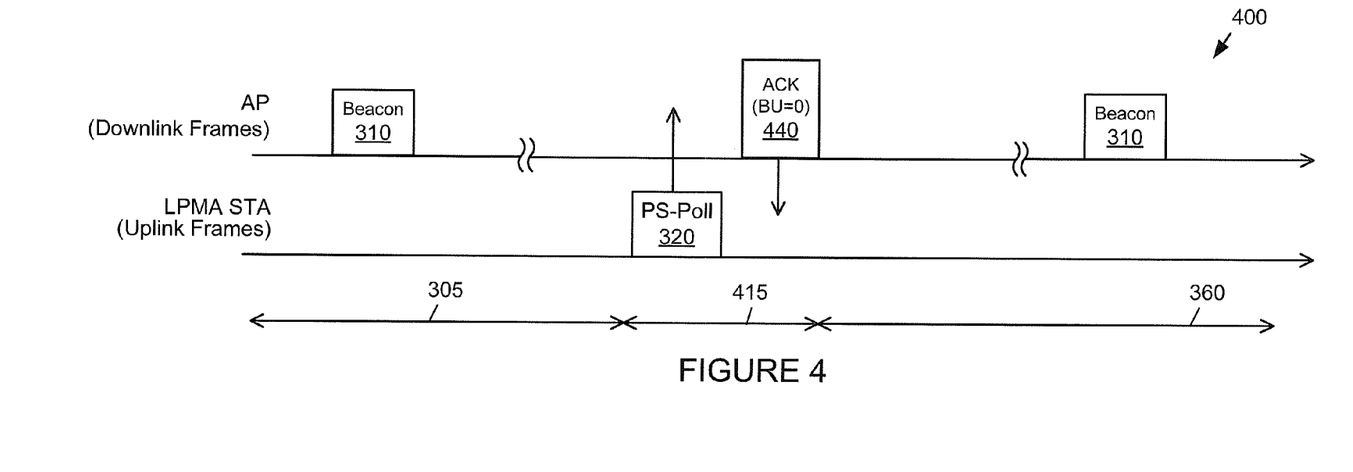
Figure 5:
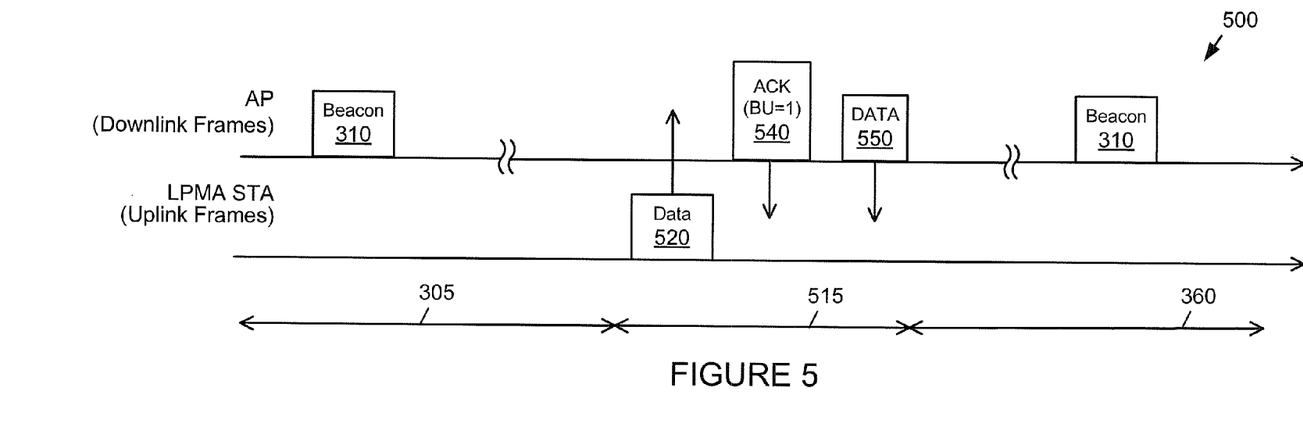
FIGS. 5 and 6 each illustrate alternative beacon interval timelines for a portion of communications within a wireless local area network environment including enhanced low power medium access stations in accordance with various embodiments of the present disclosure.
Figure 6:
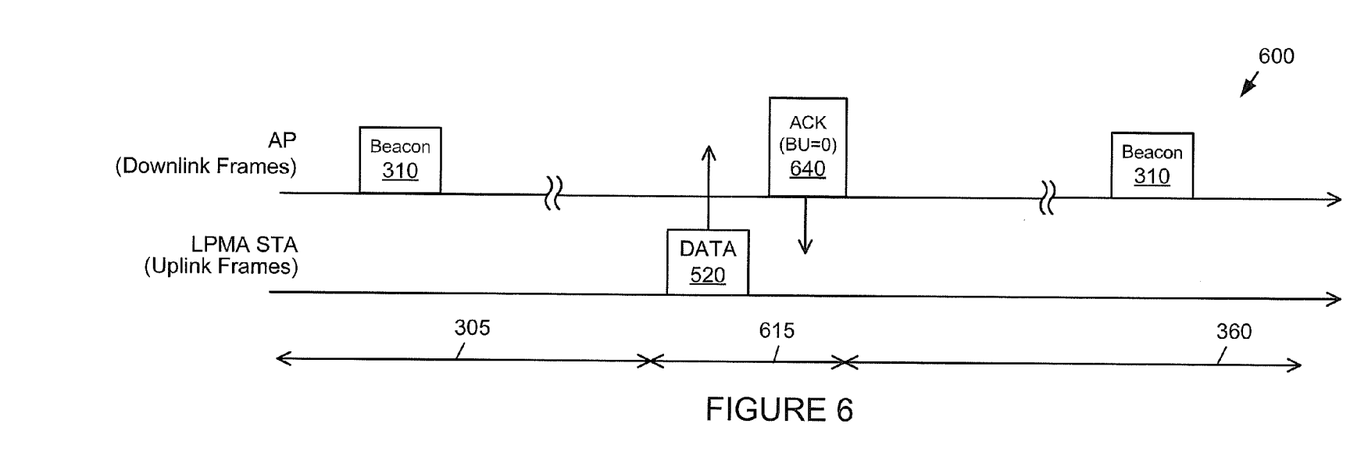

FIGS. 3 and 4 illustrate alternative beacon interval timelines for a portion of communications within wireless local area network environments including enhanced low power medium access stations. FIGS. 5 and 6 each illustrate alternative beacon interval timelines for a portion of communications within a wireless local area network environment including enhanced low power medium access stations in accordance with various embodiments of the present disclosure. Timeline 300 in FIG. 3, timeline 400 in FIG. 4, timeline 500 in FIG. 5 and timeline 600 in FIG. 6 each illustrate a relevant portion of communications that occur between consecutive transmissions of a beacon frame 310 (BEACON) by an AP 110 within BSS 115. The time between two BEACONs is a beacon interval.

Referring first to FIGS. 3 and 4, according to the PS-Poll power save procedure illustrated, enhanced LPMA STAs want to doze as long as possible without waking to receive beacons from the AP, and only wake up when necessary to send uplink DATA or to poll the AP 110 for downlink DATA updates. In timeline 300 of FIG. 3, the beacon interval includes transmissions of one BEACON 310 by the AP, transmission of a PS-Poll frame 320 by the STA, transmission of an acknowledgement frame (ACK) 340 by the AP after a Short InterFrame Space (SIFS) following the end of the PS-Poll transmission, transmission of buffered data (DATA) 350 by the AP to the STA that at least follows the backoff procedure after the end of ACK transmissions, and transmission of a second BEACON 310 by the AP. According to the PS-Poll power save procedure illustrated, an enhanced LPMA STA 120a or 120b can remain in a sleep mode 305 before, during, and after the first BEACON 310 transmission. The enhanced LMPA STA 120a or 120b is not required to wake up to listen to a BEACON 310, and does not need to receive a TIM before sending an uplink frame to the AP. An enhanced LPMA STA 120a or 120b may wake up 315 anytime and send a trigger frame (PS-Poll 320 in the example of FIG. 3) to the access point. In timeline 300, enhanced LPMA STA 120a or 120b awakens to transmit a PS-Poll frame 320 and remains awake until the AP responds with a ACK 340 with a flag set indicating that the AP has or does not have buffered data for the STA. When, as illustrated in FIG. 3, the AP returns an ACK 340 with the buffered data flag (BU) set (to a logical 1), the enhanced LPMA STA 120a or 120b then continues to remain awake until the data frame (DATA) 350 is transmitted by the AP before returning to the doze state 360.

In the alternative illustrated by FIG. 4, the enhanced LPMA STA 120a or 120b wakes 415 to send the PS-Poll 320 and receives an ACK 440 with the buffered data flag clear (a logical 0), and immediately returns to the doze state 360.

According to the present disclosure, FIG. 5 illustrates an enhancement in which an enhanced LPMA STA uses a data frame as the trigger frame. If an uplink DATA frame is utilized as the trigger frame (with, possibly, an appropriate trigger frame indication in the data frame header) by the enhanced LPMA STA 120a or 120b, the need for a PS-Poll and associated ACK can be saved, reducing the awake states required for the enhanced LPMA STA 120a or 120b. Thus, in timeline 500 the trigger frame is a data transmission 420 from the STA 120a or 120b to the AP rather than a PS-Poll as in FIGS. 3 and 4. Enhanced LPMA STA 120a or 120b remains awake until an acknowledgement 540 of the data is received from the AP. In the example of FIG. 5, the buffered data flag within the ACK 540 indicates that buffered data for the STA is waiting at the AP, so the enhanced LPMA STA 120a or 120b remains awake 515 to receive that data 550 from the AP before returning to the doze state 360. Notably, the AP should use the More Data field of an acknowledgement frame to indicate the presence of buffered data at the AP for the STA when the ACK, 540, 640 is an immediate response to a DATA trigger frame 520. In the example of FIG. 6, the buffered data flag within the ACK 640 indicates that no buffered data is waiting, so the enhanced LPMA STA 120a or 120b remains awake 615 until receiving the ACK 640 and then returns to the doze state 360 immediately after receiving the ACK 640.

LMPA Station Low Power Capability Indication

According to the present disclosure, during an association process, the enhanced LMPA STA 120a or 120b sends a Low Power Indication bit to the AP 110. This Low Power Indication bit indicates that the LMPA STA 120a or 120b has low power operation capabilities and performs Low Power Medium Access (send trigger frames to the AP without receiving the TIM element in beacons). In certain embodiments, the Low Power Indication bit is in an information element (IE) transmitted by the enhanced LMPA STA during the association process, such as an Extended Capabilities IE or a similar IE.

According to the present disclosure, the AP 110 optimizes operation based on the Low Power Indication by the enhanced LPMA STA(s) 120a and/or 120b, using that information when allocating AIDs, creating a TIM, etc. In one example, the AP may allocate the AID(s) of one or a group of enhanced LPMA STA(s) (e.g., enhanced LPMA STA 120a) along with several normal power-save STAs to different power-save groups than the AID(s) of another enhanced LPMA STA or another group of enhanced LPMA STA(s) (e.g., enhanced LPMA STA 120b), along with several "normal" power-save STAs. The AP only sends a TIM buffer frame indication to the "normal" power-save STAs that are allocated to the beacon interval. This will decrease the TIM length. In a beacon interval, only the normal power-save STAs that are allocated to the beacon interval wake up to receive the TIM and send the PS-Poll for their buffer frames in the AP. In a beacon interval, only the enhanced LPMA STAs that are allocated to the beacon interval send a trigger frame (e.g., PS-Poll) to try to receive buffered frames from the AP. This can decrease the likelihood of collisions by enhanced LPMA STAs with less enhanced LPMA STAs wake up to transmit a PS-Poll or other trigger frame at the same time.

Figure 7A:
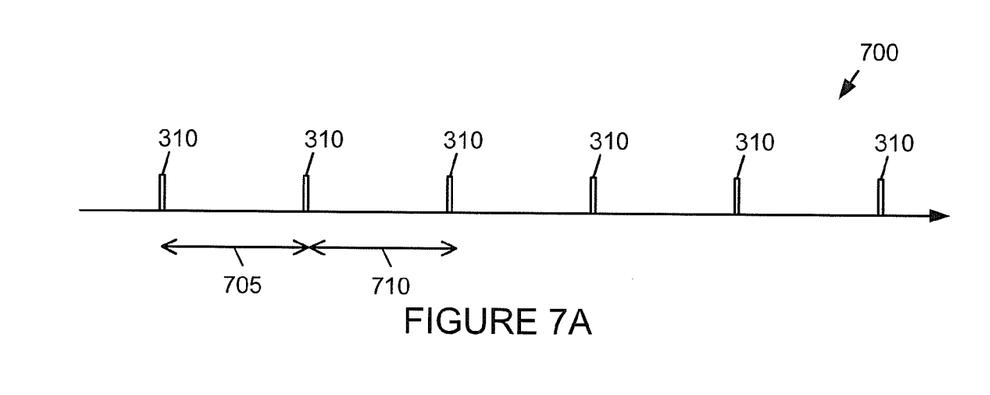
FIGS. 7A, 7B, 7C and 7D illustrate allocation of AIDs for enhanced low power medium access stations in accordance with one embodiment of the present disclosure.
Figure 7B:
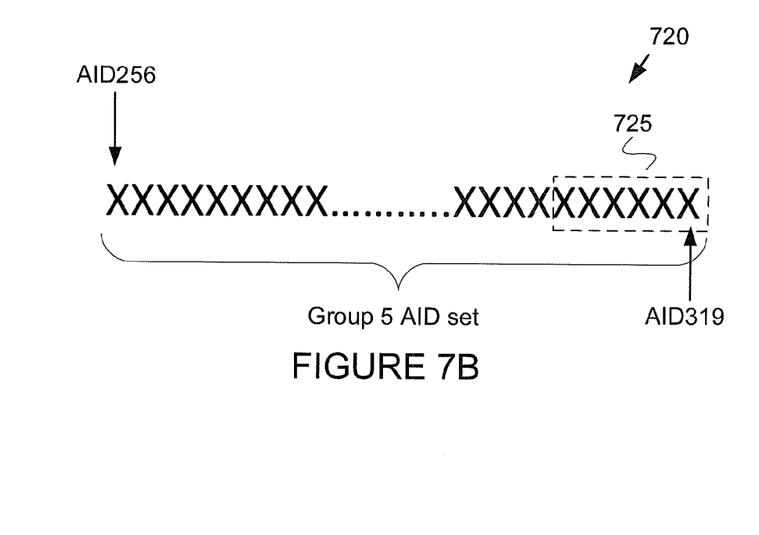
Figure 7C:
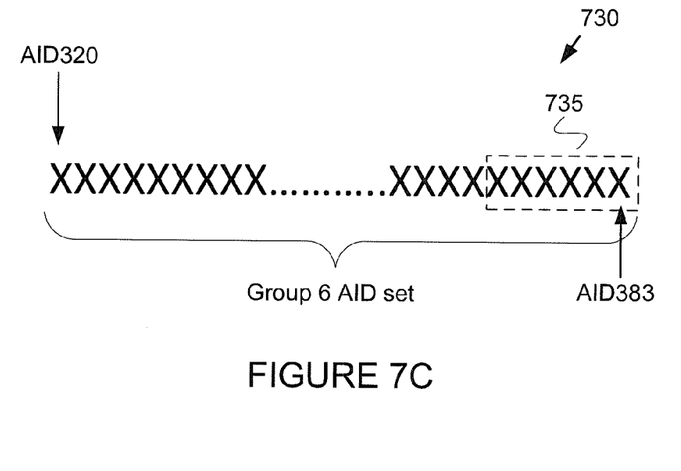

FIGS. 7A and 7B illustrate the above-described manner of use by the AP 110 of the Low Power Indication bit by enhanced LPMA STAs in allocating AIDs. For example, the AP 110 allocates an AID of one enhanced LPMA STA 120a to the edge 725 of the AID set 720 (see FIG. 7B) for one STA power-save group (Group 5), where the power-save Group 5 uses a first beacon interval 705 within timeline FIG. 7A. The AP 110 allocates an AID of a second enhanced LPMA STA 120b to the edge 735 of the AID set 730 (see FIG. 7C) in another power-save group (Group 6), where the power-save Group 6 uses a second beacon interval 710 that is different from the first beacon interval 705. Within both power-save groups, AIDs for STAs that are not enhanced LPMA STAs—meaning that the STA is capable of performing a "normal" power save procedure and does not transmit a Low Power Indication during association—are listed first, with the AIDs for enhanced LPMA STAs 120a or 120b or similar low power STAs at the edge, in a position where they may be easily truncated when transmitting the TIM. The beacon intervals may then be alternated between a group of STAs including enhanced LPMA STA 120a and a group of STAs including enhanced LPMA STA 120b, reducing the likelihood that two enhanced LPMA STAs will awaken concurrently and simultaneously transmit a trigger frame (PS-Poll, DATA, etc.), resulting in a collision.

In the beacon interval 705, the AP sends a TIM that only includes buffered frame indications for the "normal" power-save STAs that are allocated to use the beacon interval 705. The AP 110 can thus decrease the length of the TIM IE 200 as transmitted in the beacon interval 705. Transmission of a truncated TIM is acceptable since the enhanced LPMA STAs and the normal power-save STAs that are not allocated to use the beacon interval 705 will not receive the TIM of the beacon interval 705. Similarly, in the beacon interval 710, the AP sends a TIM that only includes the buffered frame indications for the normal power-save STAs that are allocated to use beacon interval 710, thus decreasing the length of the TIM IE for the beacon interval 710. Again, the truncated TIM is acceptable since the enhanced LPMA STAs and normal power-save STAs that are not allocated to the beacon interval 710 will not receive the TIM of the beacon interval 710.

Figure 7D:
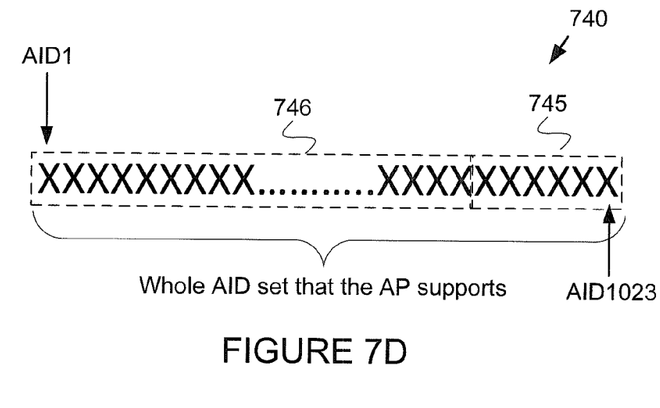

In another example, the AP 110 may allocate the AID(s) of all enhanced LPMA STA(s) (e.g., enhanced LPMA STA 120a and enhanced LPMA STA 120b) to the end of the whole AID set that the AP can support. As indicated in FIG. 7D, the AP can allow at most 1023 STAs (in this example) to associate with that AP and be allocated an AID within the AID set 740. The edge 745 of AID set 740 are the AIDs that can be allocated to enhanced LPMA STAs. The remaining AIDs 746 in AID set 740 are the AIDs that can be allocated to normal power save STAs. The AIDs 745 will never be transmitted in a TIM. AID set 746 can be separated by different groups with each group matched to different beacon intervals.

Scheduled Wakeup Time of LPMA STAs

Figure 8:
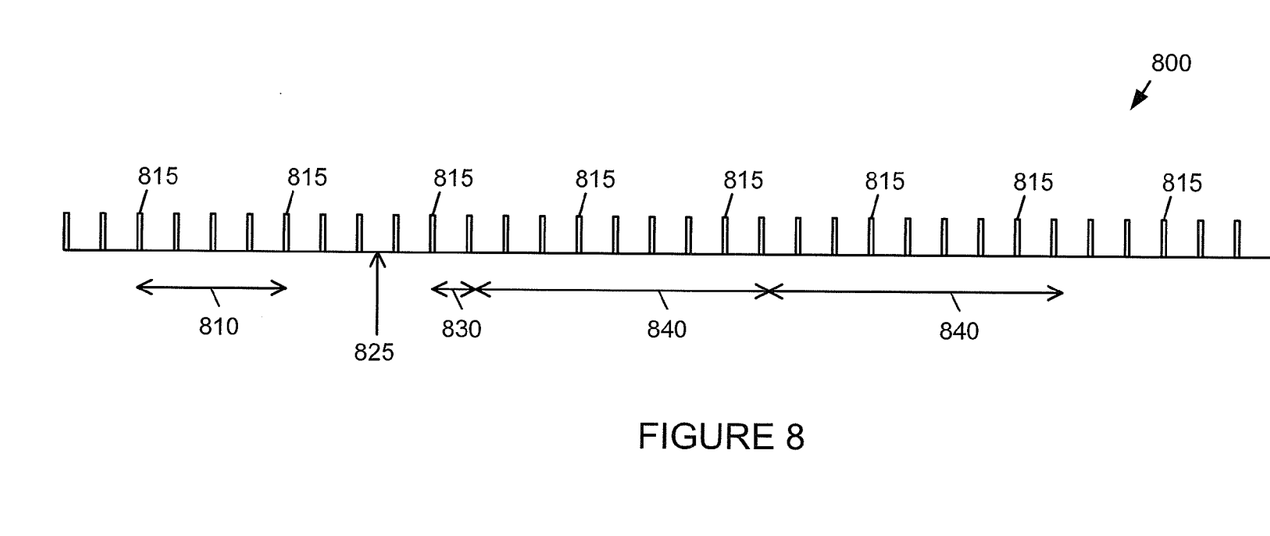
FIG. 8 illustrates a timeline for the wakeup time allocation of an enhanced low power medium access STA within a wireless local area network environment including enhanced low power medium access stations in accordance with various embodiments of the present disclosure.

In a smart grid BSS or sensing BSS where all or almost all STAs are enhanced LPMA or similar low power STAs, STAs may wake up at the same time or at times sufficiently close that the polling of the AP by one STA will collide with the polling of the AP by another STA. Distribution the wakeup time of STAs in such network can decrease the collision and save the power. FIG. 8 illustrates a timeline for the wakeup time allocation of enhanced low power medium access STAs within a wireless local area network environment including enhanced low power medium access stations in accordance with various embodiments of the present disclosure. According to the present disclosure, an AP 110 indicates that the AP 110 operates a Low Power Medium Access system and, to avoid collisions, the enhanced LPMA STAs 120a and 120b poll the AP 110 at different times, controlled by offset and sleepinterval parameters illustrated by FIG. 8. In timeline 800, the BEACON for a particular enhanced LPMA STA or a particular group n of enhanced LPMA STAs is transmitted on a periodic basis 810, i.e., one of or a multiple of the "Groupinterval", which is specified in BEACON intervals —the interval between two adjacent Group n Target Beacon Transmission Time (TBTT) 815. Another example of the BEACON for a particular enhanced LPMA STA or a particular group n of enhanced LPMA STAs is transmitted on a periodic basis of multiple beacon intervals.

An enhanced LPMA STA negotiates at time 825 the offset and sleepinterval periods. The offset 830 is a period relative to the first Group n TBTT following the negotiation; the sleep-interval period 840 is an integer number of Groupinterval, or Groupinterval*M (e.g. M=1, 2, 3 . . . ). An enhanced LPMA STA should finish its PS-Poll sequence of operations before the next following TBTT (whether a Group n TBTT 815 or an intervening TBTT), or else another low power STA (of Group n or another group) may wake up and transmit a PS-Poll to the AP at the same time as the first enhanced LPMA STA is performing a PS-Poll sequence of operations, which may create collisions.

A low power STA negotiates the offset and period (sleepinterval) of its polling through association or management frames. Each enhanced LPMA STA requests an offset, period for polling through the association procedure of other management frames, which the AP accepts or rejects based on prior scheduling for other low power STAs (i.e., the timing of the polling for such other low power STAs as defined by their offset and period). The AP can propose different offsets and periods to each enhanced LPMA STA through the association procedure or other management frames if the AP does not approve the wakeup time proposed by an enhanced LPMA STA.

The enhanced LPMA STA should follow the negotiated polling time, although that STA may also poll the AP in other times depending upon the situation (e.g., sensing a result is ready, etc.). The AP may transmit a unicast management frame as a downlink frame after receiving the trigger frame from polling by an enhanced LPMA STA. Such a management frame can be used to perform timing, management synchronization. This is especially helpful to the enhanced LPMA STAs, which do not receive beacons that include the timing information of the BSS, such that the time drifts of the enhanced LPMA STAs may become larger and larger. After receiving the timing notification frame from the AP, the enhanced LPMA STAs can synchronize internal timing with the AP's timing.

Figure 9A:
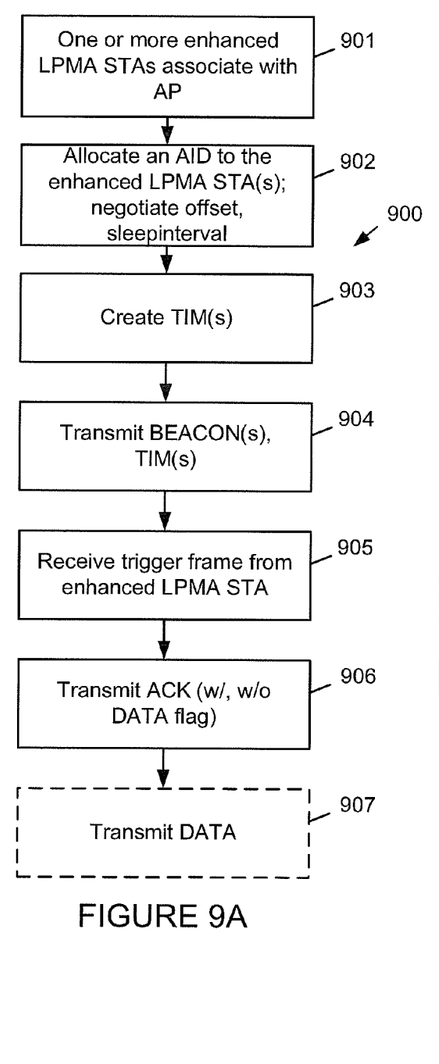
FIGS. 9A and 9B are high level flow charts for processes performed within a wireless local area network environment including enhanced low power medium access stations in accordance with various embodiments of the present disclosure.
Figure 9B:
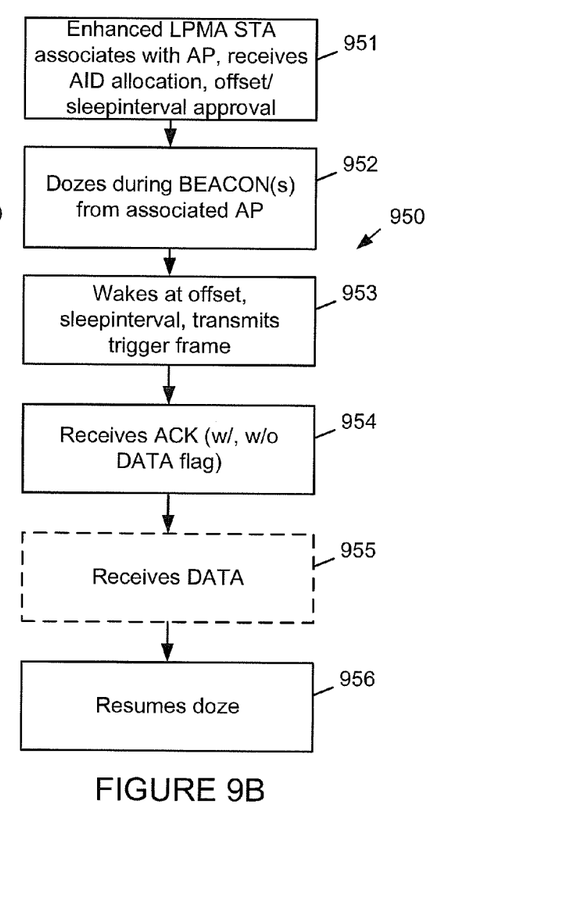

FIGS. 9A and 9B are high level flow charts for processes performed within a wireless local area network environment including enhanced low power medium access stations in accordance with various embodiments of the present disclosure. While each flow chart depicts a series of sequential steps, unless explicitly stated no inference should be drawn from that sequence regarding specific order of performance, performance of steps or portions thereof serially rather than concurrently or in an overlapping manner, or performance the steps depicted exclusively without the occurrence of intervening or intermediate steps. Moreover, those skilled in the art will recognize that a complete process is not illustrated or described. Instead, for simplicity and clarity, only so much of the respective processes as is unique to the present disclosure or necessary for an understanding of the present disclosure is depicted and described.

FIG. 9A illustrates a process 900 executed within an AP for supporting an enhanced Low Power Medium Access STA. One or more enhanced LPMA STAs in the coverage area of an AP associate with the AP (step 901), which may include transmission of a Low Power Indication within an IE by the STA during the association as described above. The AP receives Low Power Indications from one or more enhanced LPMA STAs and determines that those STAs support LPMA operation, and by inference deduces that other STAs do not support low power operation. As part of associating with STAs, the AP may indicate that the AP supports low power operation by the STAs.

The AP allocates an AID to each associated STA (step 902) that can help the AP to optimize operations (e.g., decreasing the TIM length in the BEACON), and may additionally negotiate an offset and sleepinterval unique to the respective STA (step 903). As described above, the AIDs for enhanced LPMA STAs may be assigned to alternating (or periodic, or otherwise differing) group and the different groups may be assigned to use different beacon intervals to the extent possible, and thus the different TIMs transmitted by the AP at different times may be shorter since the TIMs do not need to carry the AIDs of the enhanced LPMA STAs. That is, AIDs for two enhanced LPMA STAs may be assigned to alternating groups and the groups may be assigned use to alternating beacon intervals. In any event, AIDs for enhanced LPMA STAs may be allocated for placement at the edge of the AID set of a group or the whole association AID set, after the AIDs for STAs that do not support low power operation at all. That portion of the AIDs may be truncated from the TIM prior to TIM transmission. Alternatively, the TIM may not be transmitted at all if only enhanced LPMA STAs have buffered data at the AP, or may be excluded from transmission along with the timestamp if all STAs associated with the AP are enhanced LPMA.

The BEACON(s) and TIM(s) are transmitted by the AP at the beacon interval (step 904). In certain embodiments, a trigger frame (PS-Poll, DATA, etc.) is received by the AP from one of the enhanced LPMA STAs associated with the AP and within the coverage area (step 905). In response to each such trigger frame received from an enhanced LPMA STA, the AP determines whether the respective enhanced LPMA STA has data buffered at the AP and transmits on the downlink an acknowledgement frame (ACK) with or without the DATA flag (BU) set as appropriate (step 906), in the manner described above. The AP may transmit a buffered data frame in response each such trigger frame received from an enhanced LPMA STA. The AP then optionally transmits buffered data, if any, to the respective enhanced LPMA STA (step 907).

FIG. 9B illustrates a process 950 executed within an enhanced LPMA STA. The enhanced LPMA STA associates with an AP (step 951), including a Low Power Indication in an Extended Capabilities IE or the like, receives an AID from the AP, and may additionally request and receive approval of (not necessarily in response to a first request) an offset and sleep-interval periods. The enhanced LPMA STA then dozes, including during subsequent transmission of BEACONs by the AP (step 952), but based on an internal timer wakes at a time corresponding to the negotiated offset and sleepinterval and transmits a trigger frame to the AP (step 953). The enhanced LPMA STA may receive either an ACK from the AP (step 954), with a DATA flag (BU) set or not set, or the buffered data frame itself. The enhanced LPMA STA may receive a unicast management frame from the AP that helps the enhanced LPMA STA to synchronize internal timer(s) with the AP timer. Based on the DATA flag, the enhanced LPMA STA remains awake long enough to receive data from the AP (step 955), then resumes dozing (step 956) until the next opportunity to transmit a trigger frame based on the negotiated offset and sleepinterval.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method, comprising:
during association of at least one station (STA) with an access point (AP), receiving at the AP an indication of low power medium access (LPMA) capabilities for the at least one STA indicating that the respective STA is configured to poll the AP using a Power-Save Poll (PS-Poll) and does not wake to receive each beacon signal transmitted by the AP;
allocating an association identification (AID) to the at least one STA at the AP in a manner facilitating exclusion of the allocated AID from a traffic indication map (TIM) in a beacon signal transmitted by the AP based upon the indication of the at least one STA's LPMA capabilities; and
assigning a wakeup time to the at least one STA selected to decrease collisions with PS-Poll transmissions by other LPMA STAs associated with the AP.

2. The method of claim 1, further comprising:
separating a whole AID set into multiple groups; and
allocating an AID at an edge of AIDs for one of the groups to the at least one STA.

3. The method of claim 1, further comprising:
truncating the AID for the at least one STA from the TIM before transmitting the TIM from the AP.

4. The method of claim 1, further comprising:
in response to determining that all buffered data at the AP is for LMPA STAs, selecting to not send the TIM in a beacon signal transmitted by the AP.

5. The method of claim 1, further comprising:
allocating an AID of a first LMPA STA to a first beacon interval; and
allocating an AID of a second LMPA STA to a second beacon interval.

6. The method of claim 1, further comprising:
allocating an AID at an edge of a whole AID set for the STAs that the AP can support to the at least one STA.

7. The method of claim 1, further comprising:
negotiating an offset period for the at least one STA relative to a group Target Beacon Transmission Time (TBTT) and a sleep interval period for each of a group of STAs including the at least one STA that avoids collision between a PS-Poll transmission by the at least one STA and any PS-Poll transmissions by other STAs within the group.

8. The method of claim 1, further comprising:
in response to receiving a trigger frame at the AP from the at least one STA, transmitting a downlink frame that carries the AP's timing information to synchronize timing from the AP to the at least one STA.

9. The method of claim 8, further comprising:
transmitting a unicast management downlink frame carrying the AP's timing information.

10. An access point (AP), comprising:
a wireless transmitter and wireless receiver, each coupled to electrical processing circuitry configured to:
during association of at least one station (STA) with the AP, receive at the AP an indication of low power medium access (LPMA) capabilities for the at least one STA indicating that the respective STA is configured to poll the AP using a Power-Save Poll (PS-Poll) and does not wake to receive each beacon signal transmitted by the AP;
allocate an association identification (AID) to the at least one STA at the AP in a manner facilitating exclusion of the allocated AID from a traffic indication map (TIM) in a beacon signal transmitted by the AP based upon the indication of the at least one STA's LPMA capabilities; and
assign a wakeup time to the at least one STA selected to decrease collisions with PS-Poll transmissions by other LPMA STAs associated with the AP.

11. The access point of claim 10, wherein the electrical processing circuitry is further configured to separate a whole AID set into multiple groups, and to allocate an AID at an edge of AIDs for one of the groups to the at least one STA.

12. The access point of claim 10, wherein the electrical processing circuitry is further configured to truncate the AID for the at least one STA from the TIM before transmitting the TIM from the AP.

13. The access point of claim 10, wherein the electrical processing circuitry is configured, in response to determining that all buffered data at the AP is for LMPA STAs, to select to not send the TIM in a beacon signal transmitted by the AP.

14. The access point of claim 10, wherein the electrical processing circuitry is configured to allocate an AID of a first LMPA STA to a first beacon interval and to allocate an AID of a second LMPA STA to a second beacon interval.

15. The access point of claim 10, wherein the electrical processing circuitry is configured to allocate an AID at an edge of a whole AID set for the STAs that the AP can support to the at least one STA.

16. The access point of claim 10, wherein the electrical processing circuitry is further configured to negotiate an offset period for the at least one STA relative to a group Target Beacon Transmission Time (TBTT) and a sleep interval period for each of a group of STAs including the at least one STA that avoids collision between a PS-Poll transmission by the at least one STA and any PS-Poll transmissions by other STAs within the group.

17. The access point of claim 10, wherein the electrical processing circuitry is configured, in response to receiving a trigger frame at the AP from the at least one STA, to transmit a downlink frame that carries the AP's timing information to synchronize timing from the AP to the at least one STA.

18. The access point of claim 17, wherein the electrical processing circuitry is configured to transmit a unicast management downlink frame carrying the AP's timing information.

19. A station (STA), comprising:
a wireless transmitter and receiver coupled to electrical processing circuitry configured to:
during association with an access point (AP), transmit to the AP an indication of low power medium access (LPMA) capabilities by the STA indicating that the STA is configured to poll the AP using a Power-Save Poll (PS-Poll) and does not wake to receive each beacon signal transmitted by the AP;
receive an association identification (AID) allocated at the AP in a manner facilitating exclusion of the allocated AID from a traffic indication map (TIM) in a beacon signal transmitted by the AP based upon the indication of the STA's LPMA capabilities; and
set a wakeup time for the STA based on a signal from the AP, the wakeup time selected to decrease collisions for the STA with trigger frame transmissions by other LPMA STAs associated with the AP.

20. The station of claim 19, wherein the AID allocated to the STA is one of a whole AID set separated into multiple groups, and wherein the AID allocated to the STA is at an edge of AIDs for one of the groups.

21. The station of claim 20, wherein the AID allocated to the STA is allocated to a first beacon interval, and wherein an AID allocated to a second LPMA STA associated with the AP is allocated to a second beacon interval.

22. The station of claim 20, wherein the electrical processing circuitry is further configured to receive from the AP an indication of an offset period for the STA relative to a group Target Beacon Transmission Time (TTBT) and a sleep interval period for each of a group of STAs including the STA that will avoid collision between a PS-Poll transmission by the STA and any PS-Poll transmissions by other STAs within the group.

23. The station of claim 20, wherein the electrical processing circuitry is further configured to receive a unicast management downlink frame configured to synchronize timing with the AP.

24. A method, comprising:
during association with an access point (AP),
transmitting from a station (STA) to the AP an indication of low power medium access (LPMA) capabilities by the STA indicating that the STA is configured to poll the AP using a Power-Save Poll (PS-Poll) and does not wake for each beacon signal transmission by the AP, and
receiving at the STA an association identification (AID) allocated at the AP in a manner facilitating exclusion of the allocated AID from a traffic indication map (TIM) in a beacon signal transmitted by the AP based upon the indication of the STA's LPMA capabilities;
dozing by the STA during transmission of at least one beacon signal by the AP;
waking by the STA at a wakeup time indicated by the AP to transmit a trigger frame to the AP, wherein the trigger frame is a DATA frame, the wakeup time selected to decrease collisions for the STA with trigger frame transmissions by other LPMA STAs associated with the AP; and
after transmitting the trigger frame, resuming dozing by the STA once an acknowledgement and buffered data, if any, is received from the AP.

25. The method of claim 24, wherein a header of the DATA frame includes a trigger frame indication.

26. The method of claim 24, further comprising:
determining if data for the LPMA STA is buffered at the AP from a buffered unit (BU) bit within an acknowledgement frame (ACK) received from the access point in response to the trigger frame.

27. The method of claim 24, further comprising:
requesting approval by the AP of an offset period relative to a group Target Beacon Transmission Time (TTBT) and a sleep interval period for each of a group of STAs including the STA that will control a timing of waking by the STA to transmit the trigger frame at a time that will avoid collision with any trigger frame transmission by other STAs within the group, wherein the trigger frame is one of a PS-Poll frame and a DATA frame.

* * * * *